(12) United States Patent
Montalbano et al.

(10) Patent No.: US 9,218,751 B2
(45) Date of Patent: Dec. 22, 2015

(54) CLINICAL SIMULATION DEVICE

(71) Applicant: DentalEZ, Inc., Malvern, PA (US)

(72) Inventors: Gregory Montalbano, Huntington, NY (US); Christopher Montalbano, Huntington, NY (US); Andrew Martin, Bayport, NY (US); Richard Petrillo, Franklin Square, NY (US)

(73) Assignee: DentalEZ, Inc., Malvern, PA (US)

( * ) Notice: Subject to any disclaimer, the term of this patent is extended or adjusted under 35 U.S.C. 154(b) by 187 days.

(21) Appl. No.: 13/906,828

(22) Filed: May 31, 2013

(65) Prior Publication Data

US 2014/0356835 A1     Dec. 4, 2014

(51) Int. Cl.
  *G09B 23/28*    (2006.01)
  *G09B 23/30*    (2006.01)

(52) U.S. Cl.
  CPC ............. *G09B 23/283* (2013.01); *G09B 23/30* (2013.01)

(58) Field of Classification Search
  CPC ...... G09B 23/28; G09B 23/283; A61G 13/02; A61G 13/06; A61G 13/08; A61G 15/00; A61G 15/02; A61G 15/14
  USPC .................................................. 434/262–275
  See application file for complete search history.

(56) References Cited

U.S. PATENT DOCUMENTS

| | | | |
|---|---|---|---|
| 4,397,439 A | 8/1983 | Wilbur et al. | |
| 5,102,340 A | 4/1992 | Berlinghoff et al. | |
| 5,108,292 A | 4/1992 | Kirk et al. | |
| 5,158,488 A | 10/1992 | Berlinghoff et al. | |
| 5,433,613 A | 7/1995 | Berlinghoff et al. | |
| 5,480,307 A | 1/1996 | Lang et al. | |
| D392,878 S | 3/1998 | Nordstrom et al. | |
| 5,766,017 A | 6/1998 | Nevin et al. | |
| D627,070 S | 11/2010 | Staufenberg et al. | |
| 2010/0323338 A1 | 12/2010 | Bortolus | |

OTHER PUBLICATIONS

A-dec Simulator product brochure (2010).
Temple Univerisity and DentalEZ Group, "Partnering to Design the Future in Dental Education," presented in Jun. 2012.
University of the Pacific and DentalEZ Group, "The Future in Dental Education," presented in Dec. 2011 and Oct. 2012.
University of the Pacific and DentalEZ Group, "Partnering to Design the Future in Dental Eduction," presented in Mar. 2012.
Relevent Excerpt of Bid Proposal Submitted to Univeristy of the Pacific, Mar. 2012.

*Primary Examiner* — Timothy A Musselman
(74) *Attorney, Agent, or Firm* — Panitch Schwarze Belisario & Nadel LLP (57) ABSTRACT

A dental simulator includes a base and a platform connected to the base. The base has a first end, an opposing second end, and a longitudinal axis extending from the first end toward the second end. The platform has at least a first portion which is movably connected to the base. The first portion of the base also includes at least one actuator. The simulator further includes a torso support movably connected to the base and at least a first instrument holder movably connected to the base. At least the first portion of the platform, the torso support, and the first instrument holder are configured to move in unison with respect to the base along the longitudinal axis thereof.

15 Claims, 6 Drawing Sheets

CLINICAL SIMULATION DEVICE

BACKGROUND OF THE INVENTION

An embodiment of the present invention relates generally to a dental simulator, and more particularly, to a dental simulator that can be easily customized to suit the preferences of the individual end user.

Before dental students are permitted to treat patients in a clinic, they develop their skills by using mannequins under the supervision of their instructors. Conventional clinical simulation workstations are known for use as dental teaching and practicing apparatus. Such conventional apparatuses typically include a rolling base, a torso, a pivotable or rotatable mannequin head, and instrument holders.

However, the longitudinal positions of the base, the torso, the mannequin head and the instrument holders of such conventional simulators are typically fixed. As such, conventional simulators are not adjustable to accommodate dental students whose heights and anatomy may vary.

Also, the electronic controls for the dental instruments included with such conventional simulators are typically provided directly on or in the instrument holders. As such, the instrument holders can only be moved to a limited number of positions, such that only a limited number of configurations of the instrument holders is possible. However, such limited number of instrument configurations may not suit the preferences of every individual end user.

Thus, it is an object of the present invention to provide a clinical simulation station in which various components of the dental simulator are adjustable in orientation to suit the varying preferences of different individual end users.

BRIEF SUMMARY OF THE INVENTION

Briefly stated, one embodiment of the present invention is directed to a dental simulator comprising a base having a first end, an opposing second end, and a longitudinal axis extending from the first end toward the second end. The dental simulator further includes a platform connected to the base. The platform has at least a first portion which is movably connected to the base. At least a first actuator is provided on the first portion of the platform. A torso support is movably connected to the base and at least a first instrument holder is movably connected to the base. At least the first portion of the platform, the torso support, and the first instrument holder are configured to move in unison with respect to the base along the longitudinal axis thereof.

Another embodiment of the present invention is directed to a dental simulator comprising a base having a first end and an opposing second end, a platform connected to the base, a mannequin torso support connected to the base, a mannequin torso secured to the torso support, a mannequin head secured to the torso, at least a first instrument holder secured to the base, and at least a first dental instrument stored in the first instrument holder. The instrument holder is devoid of any electrical components or controls. The platform includes at least one actuator which controls the functionality of the first dental instrument.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown.

In the drawings.

DETAILED DESCRIPTION OF THE INVENTION

Certain terminology is used in the following description for convenience only and is not limiting. The words "right," "left," "top," "bottom" and "lower" designate directions in the drawings to which reference is made. The words "first," "second," "third" and "fourth" designate an order of operations in the drawings to which reference is made, but do not limit these steps to the exact order described. The words "inwardly" and "outwardly" refer to directions toward and away from, respectively, the geometric center of the device and designated parts thereof. Unless specifically set forth herein, the terms "a," "an" and "the" are not limited to one element, but instead should be read as meaning "at least one." The terminology includes the words noted above, derivatives thereof and words of similar import.

Figure 1:
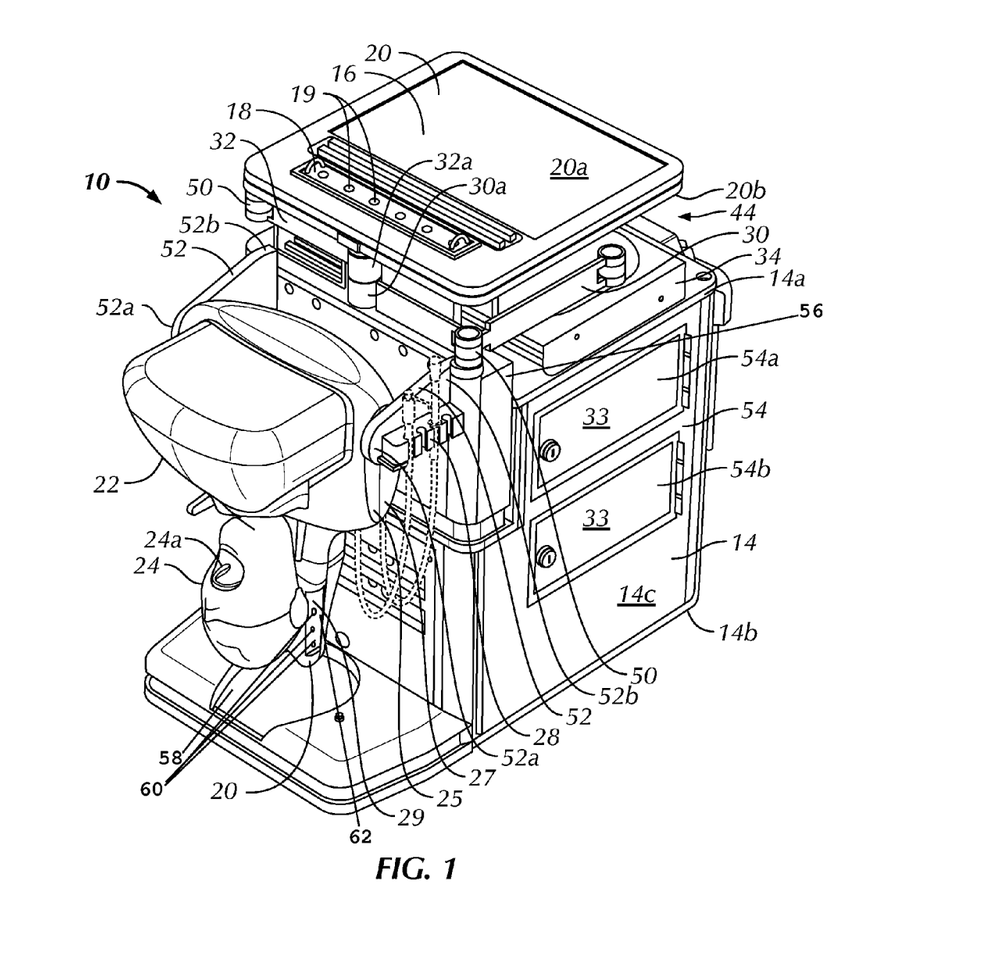
FIG. 1 is a front top perspective view of a dental simulator in accordance with a first embodiment of the present invention in a storage position.

Referring to the drawings in detail, wherein like numerals and characters indicate like elements throughout, there is shown in FIGS. 1-5 a presently preferred embodiment of a clinical simulation workstation in accordance with the present invention. With reference initially to FIG. 1, the clinical simulation workstation is a simulator, generally designated 10, for dental teaching and practice. In one embodiment, the simulator 10 may be removably or fixedly secured to a workstation (not shown).

Figure 3:
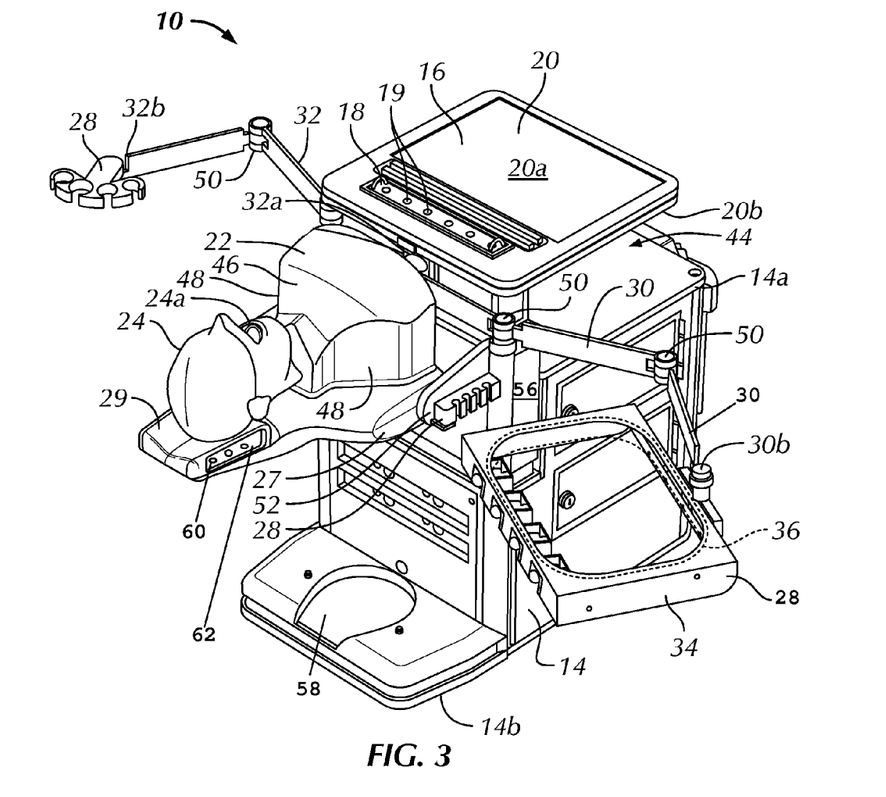
FIG. 3 is a front top perspective view of the dental simulator shown in FIG. 1 in a use position.
Figure 4:
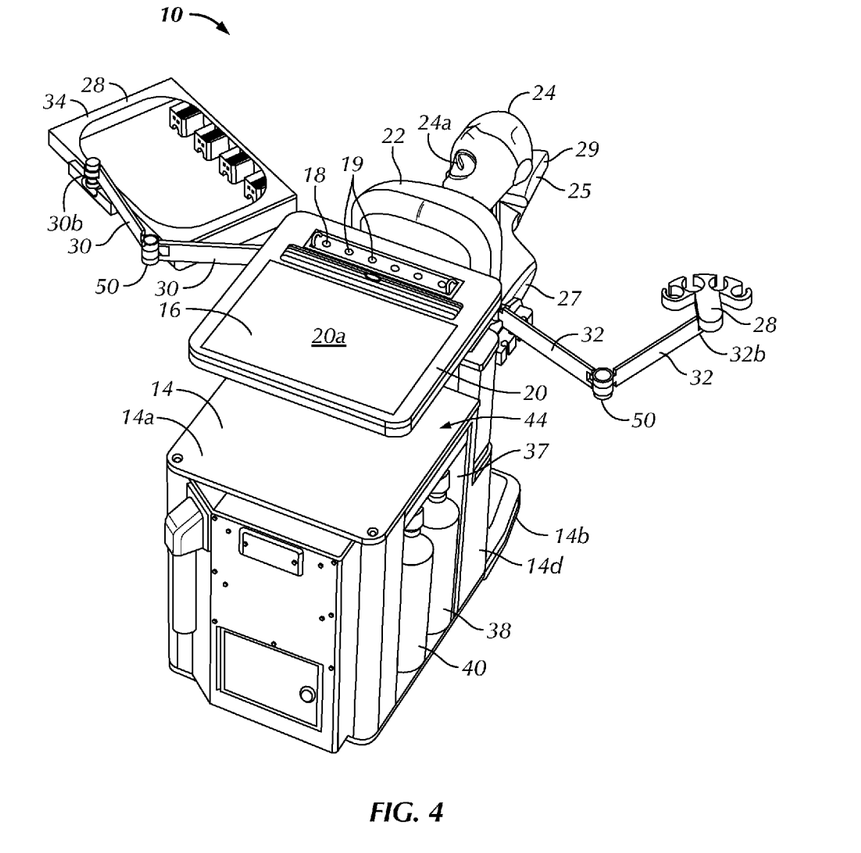
FIG. 4 is a rear top perspective view of the dental simulator shown in FIG. 1 in the use position.
Figure 5:
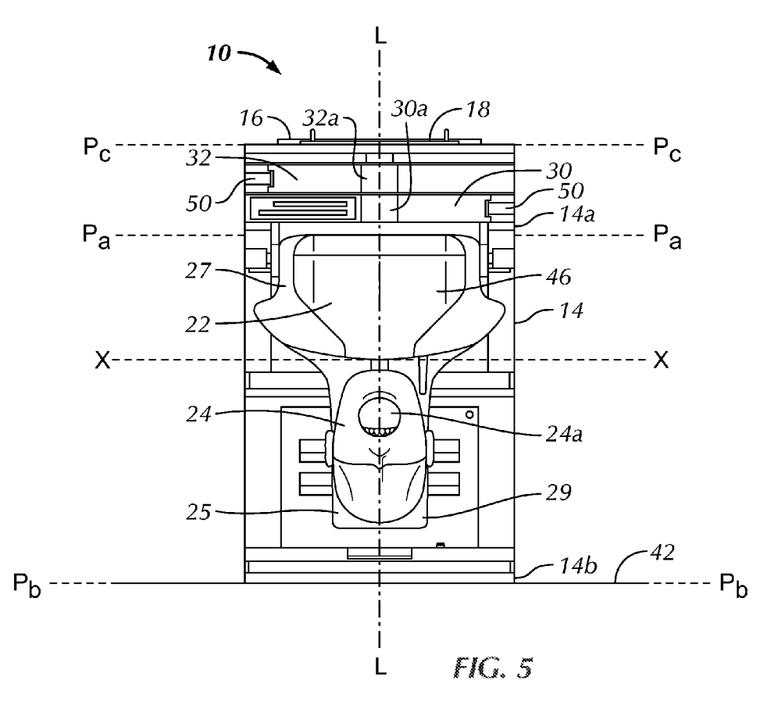
FIG. 5 is a front elevational view of the dental simulator shown in FIG. 1.

With particular reference to FIGS. 1-5, the simulator 10 comprises a base 14 and a platform 16 connected to the base 14. More particularly, the base 14 has a first or top end 14a and an opposing second or bottom end 14b. Referring to FIG. 5, the first end 14a of the base 14 generally extends in a first horizontal plane Pa and the second end 14b of the base 14 generally extends in a second horizontal plane Pb. The second horizontal plane Pb extends generally parallel to the first horizontal plane Pa and is generally defined by the floor or other surface 42 on which the base 14 is supported. In one embodiment, the simulator 10 also preferably includes a locking brake (not shown), and more preferably an air-actuated locking brake, which can be selectively actuated to prevent movement of the base 14 with respect to the floor surface 42 when the simulator 10 is in use.

The base 14 is preferably at least partially hollow, such that the base 14 is configured to store various items or objects required or useful for dental teaching and practice. As shown in FIG. 1, in a first lateral side 14c of the base 14, there is provided a first storage area 54 to house such items or objects. The storage area 54 preferably includes at least a first storage compartment 54a, and more preferably first and second storage compartments 54a and 54b. Each of the first and second storage compartments 54a, 54b is preferably closed off by a lockable door 33. The interior volume of each storage compartment 54a, 54b is not of vital importance to the present invention, and may be customized to be as large or as small as necessary to meet the needs of each individual end user.

Figure 2:
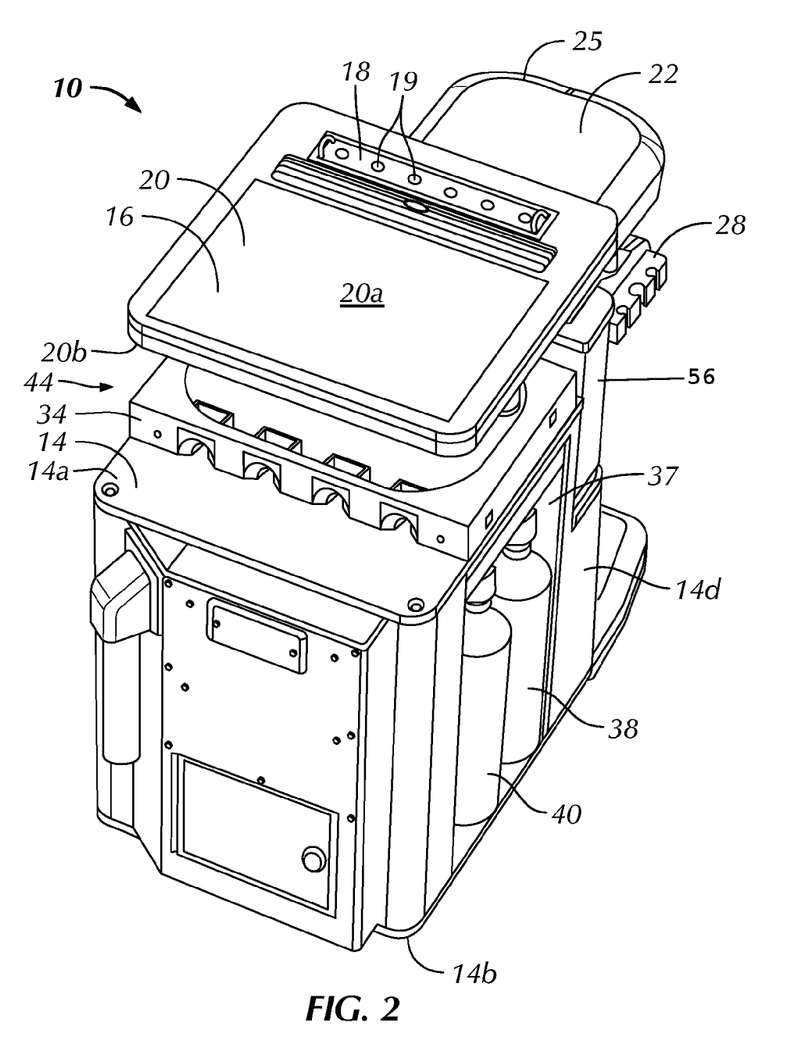
FIG. 2 is a rear top perspective view of the dental simulator shown in FIG. 1.

As shown in FIG. 2, in a second lateral side 14d of the base 14, which opposes the first lateral side 14c, there is preferably provided a second storage area 37 configured to house other items or objects, such as a first container 38 and a second container 40. The first container 38 is preferably part of a clean water delivery system which delivers water to the simulator 10, and more particularly to various dental handpieces 26, as will be described in more detail hereinafter. As such, the first container 38 is preferably a water-storage container 38 which stores clean water to be delivered to the simulator 10. The second container 40 is preferably part of a vacuum waste removal system which evacuates solid and liquid waste from the simulator 10, and more particularly from a mannequin head 24, as will be described in more detail hereinafter. As such, the second container 40 is preferably a vacuum waste-storage container 40 which stores waste products evacuated from the simulator 10. The water-storage container 38 and the waste-storage container 40 are both preferably easily removable from the base 14 so that each container 38, 40 may be emptied, refilled or replaced as needed.

As shown in FIG. 5, the base 14 preferably extends vertically along a first longitudinal axis L which is generally perpendicular to the floor surface 42. The longitudinal axis L of the base 14 preferably extends from the first, top end 14a toward the second, bottom end 14b of the base 14. The base 14 also preferably extends horizontally along a first lateral axis X which extends generally perpendicular to the first longitudinal axis L and parallel to the floor surface 42. The lateral axis X of the base 14 preferably extends from the first lateral side 14c toward the second lateral side 14d of the base 14. The base 14 preferably has a generally rectangular or square shape when viewed from above or the side, but it will be understood that the base 14 may have any appropriate shape as long as the base 14 can support all of the necessary components of the simulator 10, as described in more detail hereinafter.

The platform 16 is connected to the base 14 proximate the first end 14a of the base 14. As such, the platform 16 generally defines the top or uppermost end or portion of the simulator 10. More particularly, at least a portion of the platform 16 is secured to a connector assembly 56 which movably connected to the base 14. The connector assembly 56 is preferably configured to move in a first or upward direction and/or in a second or downward direction with respect to the base 14 along the longitudinal axis L thereof.

The platform 16 preferably has a generally rectangular or square shape when viewed from above, similar to that of the base 14. However, it will be understood that the platform 16 may have a shape, such as circular, ovular, elliptical and the like, which is different from the shape of the base 14. It will also be understood that while the platform 16 depicted in FIGS. 1-4 has a surface area of a dimension similar to that of the first, upper end 14a of the base 14, the surface area of the platform 16 may be smaller or larger than the base 14.

The platform 16 is preferably generally axially aligned with the base 14 and is raised with respect to the base 14. As such, the platform 16 is positioned above the first, top end 14a of the base 14. More particularly, in a storage position, the platform 16 generally extends in a third horizontal plane Pc. The third horizontal plane Pc extends generally parallel to the first and second horizontal planes Pa, Pb and is located above the first and second horizontal planes Pa, Pb along and generally perpendicular to the first longitudinal axis L of the base 14. The platform 16 is thus preferably spaced apart from the first end 14a of the base 14, such that a hollow space or cavity 44 is formed between the platform 16 and the first end 14a of the base 14.

The platform 16 includes at least a first portion 18 provided with at least one actuator 19. The actuator 19 is preferably a control button 19. More preferably, the first portion 18 of the platform 16 includes a plurality of control buttons 19. The first portion 18 of the platform 16 is preferably a control panel 18 and, more preferably, a control touchpad 18. While the term button is used herein to describe the actuators included on the control panel 18, it will be understood that the actuators may take any appropriate form, such as switches, knobs, push buttons, touch buttons, and the like. It will also be understood that the control panel 18 can have any shape and dimensions. Also, the control panel 18 may be flush with, raised relative to, or indented relative to the remainder of the platform 16.

Preferably, at least a portion of the platform 16 is movably connected to the base 14. More preferably, at least the first portion 18 (i.e., the control panel 18) of the platform 16 is movably connected to the base 14. More specifically, at least the first portion 18 (e.g., the control panel 18) of the platform 16 is connected to the connector assembly 56, and thus is configured to move in a first or upward direction and/or in a second or downward direction with respect to the base 14 along the longitudinal axis L thereof. When the first portion 18 of the platform 16 is moved in the upward direction, away from the base 14, the overall area of the cavity 44 is increased and at least the first portion 18 of the platform 16 generally extends in a horizontal plane (not shown) that is disposed above the first, second and third horizontal planes Pa, Pc, Pc. When the first portion 18 of the platform 16 is moved in the downward direction, toward the base 14, the overall area of the cavity 44 is decreased and at least the first portion 18 of the platform 16 generally extends in a horizontal plane (not shown) that is disposed below the third horizontal plane Pc of the platform 16 and above the first and second horizontal planes Pa, Pb of the base 14.

Thus, the simulator 10 is configured to accommodate students of varying heights and/or anatomies. For example, a relatively tall student or a student with long arms may adjust at least the control panel 18 in the upward direction to raise the control panel 18 to a position that accommodates his or her relatively large height. Similarly, a relatively shorter student or a student with short arms may adjust the control panel 18 in the downward direction to lower the control panel 18 to a position that accommodates his or her relatively small height.

In one embodiment (not shown), the platform 16 includes only the first portion 18 constituting the control panel 18. As such, the entirety of the platform 16 is movably connected to the base 14.

Preferably, however, in a first embodiment, as shown in FIGS. 1-5, the platform 16 further includes a second portion 20. The second portion 20 of the platform 16 has a first upper surface 20a configured to support various items or objects and an opposing second lower surface 20b. As such, the second portion 20 of the platform 16 is a support panel 20. In one embodiment, as shown in FIGS. 1-5, the control panel 18 is integrally formed with the support panel 20 to define the platform 16. Thus, the entire platform 16 is movably connected to the first end 14a of the base 14, such that both the control panel 18 and the support panel 20 of the platform 16 move in unison with respect to the base 14.

Figure 6:
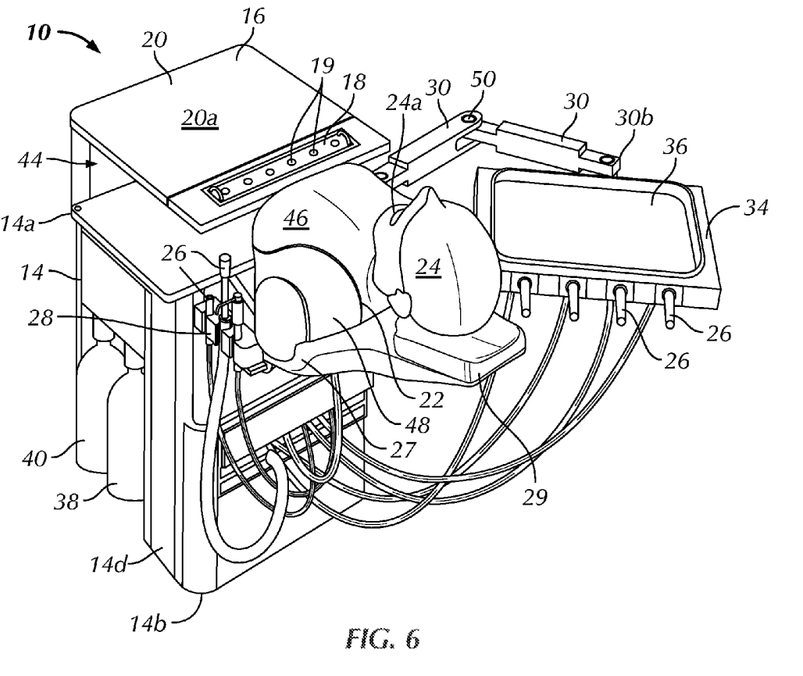
FIG. 6 is a front top perspective view of a dental simulator in accordance with a second embodiment of the present invention in a use position.

In a second embodiment, as shown in FIG. 6, the control panel 18 is formed separately from the support panel 20 thereof, such that the platform 16 comprises two separately formed components. Thus, the control panel 18 of the platform 16 is movable with respect to the base 14, while the support panel 20 may remain stationary and fixed in position with respect to the base 14. However, it will be understood that even when the support panel 20 and the control panel 18 are separately formed, the support panel 20 may move together with or independently of the control panel 18. Most preferably, the entire platform 16 is movably connected to the first end 14a of the base 14, such that both the control panel 18 and the support panel 20 of the platform 16 move in unison with respect to the base 14, to better customize the simulator 10 for use by students of varying heights and/or anatomies. The embodiment of FIG. 6 is generally similar to that of FIGS. 1-5 in all other respects.

Referring to FIG. 1, the simulator 10 further comprises a torso support 25, and more particularly a mannequin torso support 25. The torso support 25 preferably takes the form of all or part of a chair, and more particularly a chair of the type that would typically be found in a dental office. The torso support 25 is connected to the base 14. More particularly, the torso support 25 is preferably connected to the connector assembly 56 which is connected to the base 14.

Preferably, the torso support 25 includes a proximal base portion 27 connected to the base 14 and a distal head portion 29. More preferably, the proximal base portion 27 of the torso support 25 is connected to the base 14 proximate the first end 14a thereof. By the term "proximate," it will be understood that the torso support 25 need not be connected to the base 14 at a position corresponding to the first end 14a thereof, but instead may be connected to the base 14 at a position between the first and second ends 14a, 14b close to the first end 14a. Most preferably, the proximal base portion 27 of the torso support 25 is connected to the connector assembly 56 which is connected to the base 14.

In one embodiment, two lateral connectors 52 are provided to connect the torso support 25 to the base 14, and more preferably to the connector assembly 56. One end 52a of each connector 52 is secured to the proximal base portion 27 of the torso support 25 while the opposing end 52b of each connector 52 is secured to the base 14, and more preferably to the connector assembly 56. The torso support 25 is preferably movably connected to the base 14, such that the torso support 25 is configured to move, in unison, with at least the first portion 18 of the platform 16 in the upward and/or downward directions with respect to the base 14 along the longitudinal axis L thereof. More preferably, the torso support 25 is configured to simultaneously move in the upward and/or downward directions along the longitudinal axis L of the base 14 together with the entire platform 16. In one embodiment, the torso support 25 and the platform 16 may be connected to the base 14 via a common connection point (i.e., the connector assembly 56) to facilitate the simultaneous movement of the torso support 25 and the platform 16.

In one embodiment, the torso support 25 is also hingedly or pivotably connected to the base 14, such that the torso support 25 is also pivotably or rotatably movable with respect to the base 14 about the lateral axis X thereof. More particularly, the torso support 25 is preferably pivotably or rotatable up to about 90° about the lateral axis X of the base 14. As such, in a first or operable position of the simulator 10, as shown in FIGS. 3-4, the torso support 25 extends outwardly away from the base 14, generally perpendicular to the longitudinal axis L of the base 14, such that the head portion 29 is spaced apart from the base 14. In a second or storage position of the simulator 10, as shown in FIGS. 1-2 and 5, the torso support 25 is rotated approximately 90° about the lateral axis X of the base 14, such that the torso support 25 extends generally along a longitudinal length of the base 14 from the first end 14a toward the second end 14b, generally parallel to the longitudinal axis L, with the head portion 29 being positioned proximate the second end 14b of the base 14 and the floor surface 42.

The simulator 10 further includes a mannequin torso 22 positioned on the mannequin torso support 25 and a mannequin head 24 connected to the mannequin torso 22. The mannequin torso 22 preferably includes a chest portion 46 and a pair of shoulder portions 48 connected to the chest portion 46 to simulate the torso of a human patient. The chest portion 46 and the shoulder portions 48 of the mannequin torso 22 are preferably each separately removable from a remainder of the mannequin torso 22 and replaceable with different chest and shoulder portions 46, 48, such that the mannequin torso 22 may be customized to simulate patients of different body types and genders.

The mannequin head 24 simulates a dental patient's head and contains an oral cavity 24a which simulates a dental patient's open mouth. The mannequin head 24 is preferably positioned on the head portion 29 of the torso support 25, while the torso 22 is preferably positioned on the base portion 27 of the torso support 25. As such, in the first or operable position of the simulator 10, as shown in FIGS. 3-4, the mannequin head 24 is spaced apart from the base 14 so as to be worked with by a student. In the second or storage position, as shown in FIGS. 1-2 and 5, the torso support 25 is rotated approximately 90° and stored in an upside down orientation, such that the mannequin head 24 is located proximate the second end 14b of the base 14 and the floor surface 42. The torso support 25 is preferably configured to receive and be connected to all conventional mannequin torsos which are currently known or which will be developed. The mannequin torso 22 is preferably configured to receive and be connected to all conventional mannequin heads which are currently known or will be developed.

The mannequin head 24 and/or the mannequin torso 22 are each preferably axially pivotable or rotatable to a limited degree about the longitudinal axis L and about the lateral axis X of the base 14, either together or relative to one another, so as to simulate the movements of a real-life patient (e.g., as a patient turns his or her head and/or torso relative the dental chair or lifts his or her head and/or torso relative the dental chair). Also, since the torso support 25 is configured to move in the upward or downward directions along the longitudinal axis L of the base 14, together with at least the first portion 18 of the platform 16 (and preferably the entire platform 16), the mannequin head 24 and the mannequin torso 22 supported on the torso support 25 also move in the upward or downward directions together and in unison with the torso support 25 and the platform 16 (or just the control panel 18 thereof).

The simulator 10 further comprises at least one instrument holder 28. More preferably, the simulator 10 comprises a plurality of instrument holders 28. One or more dental handpieces or instruments 26 are removably secured to each instrument holder 28. Preferably, each instrument holder 28 stores a plurality of air-driven dental handpieces 26. Each instrument holder 28 is also preferably movably connected, either directly or indirectly, to the base 14.

In one embodiment, one or more of the instrument holders 28 may be directly connected to a portion of the base 14, preferably proximate the first end 14a thereof. In another embodiment, one or more of the instrument holders 28 may be connected to the torso support 25, such that the instrument holders 28 are movably connected to the base 14 via the torso support 25. In another embodiment, one or more of the instrument holders 28 may be connected to the connector assembly 56. It will also be understood that some of the instrument holders may be directly connected to a portion of the base 14, while others are connected to the torso support 25 and others are connected to the connector assembly 56. It will also be understood that one or more of the instrument holders 28 may be connected to other movable components of the simulator 10 other than the torso support 25, such as the platform 16, such that the holders 28 would still be movably connected to the base 14.

At least one of the instrument holders 28, and more preferably each instrument holder 28, is configured to move, in unison, with at least the first portion 18 of the platform 16 (and more preferably the entire platform 16) and the torso support 25 in the upward and/or downward directions with respect to the base 14 along the longitudinal axis L thereof. Further, each instrument holder 28 is preferably hingedly connected to the base 14 or the torso support 25, such that the instrument holder 28 is configured to swivel or pivot relative to the base 14 about at least the longitudinal axis L thereof.

In one embodiment, the simulator 10 further comprises at least a first extender arm 30. More preferably, the simulator 10 includes a first extender arm 30 and a second extender arm 32. Each of the extender arms 30, 32 includes a first proximal end 30a, 32a and an opposing second distal end 30b, 32b. The first proximal end 30a, 32a is pivotably connected to the base 14, either directly or indirectly via connection to the connector assembly 56, the torso support 25 or the platform 16. A first one of the instrument holders 28 is preferably attached to the distal end 30b of the first extender arm 30 and a second one of the instrument holders 28 is preferably attached to the distal end 32b of the second extender arm 32. More preferably, the first and second instruments holders 28 are each pivotably attached to the distal ends 30b, 32b of the first and second extender arms 30, 32, respectively.

It will be understood that the simulator 10 may include a third extender arm, a fourth extender arm, and so on depending on the number of instrument holders 28 which must be extended outwardly from the base 14 of the simulator 10.

Each extender arm 30, 32 is preferably configured to pivot or rotate relative to each other about a common vertical axis which corresponds to the longitudinal axis L of the base 14. More preferably, the extender arms 30, 32 can preferably rotate approximately 180° about the common vertical axis. As such, if the first extender arm 30 is initially positioned proximate the first lateral side 14c of the base 14 and the second extender arm 32 is initially positioned proximate the second lateral side 14d of the base 14, the respective positions of the extender arms 30, 32 may be switched by rotating the arms 30, 32 about the common vertical axis. As such, after rotation, the first extender arm 30 may be positioned proximate the second lateral side 14d of the base 14 and the second extender arm 32 may be positioned proximate the first lateral side 14d of the base 14. As such, the simulator 10 can be customized for use by either left-handed or right-handed students.

One or more of the extender arms 30, 32 may also preferably include one or more intermediate pivot connections 50 at positions between the first ends 30a, 32a and the second ends 30b, 32b. Each intermediate pivot connection 50 allows for pivoting of the extender arms 30, 32 into more varied configurations. In particular, the pivot connections 50 facilitate storage of the extender arms 30, 32 within the footprint of the simulator 10 when the simulator 10 is not in use (see FIGS. 1-2).

More particularly, to place the simulator 10 in the storage position, as shown in FIGS. 1-2, a user may pivot the extender arms 30, 32 about the proximal ends 30a, 30b and the intermediate pivot connections 50, such that at least a portion of the extender arms 30, 32, as well as any instrument holders 28 attached thereto, can be stored within the cavity 44 between the platform 16 and the base 14. More preferably, the entirety of the extender arms 30, 32, as well as any instrument holders 28 attached thereto, can be completely stored within the cavity 44 between the platform 16 and the base 14. It will be understood by those skilled in the art that while only two extender arms are shown, the simulator 10 may include additional extender arms, such that every instrument holder 28 is attached to an extender arm. It will also be understood that, alternatively, the simulator 10 need not include any extender arms.

In one embodiment, at least one of the instrument holders 28 is preferably an instrument tray holder unit 34 configured to support an instrument tray 36, shown in phantom in FIGS. 3-4. Students may place hand instruments, dental appliances, and the like on the instrument tray 36.

In one embodiment, each of the instrument holders 28 is preferably devoid of any electrical components or controls. As such, the functionality, including actuation and operation, of the dental instruments 26 stored on the instrument holders 28 is not controlled by any controls provided on the holders 28 themselves. Instead, the functionality of the dental instruments 26 is controlled by the one or more remote control buttons 19 provided on the control panel 18 of the platform 16. As such, the dental instruments are operatively connected to one or more of the control buttons 19. The positions of the instrument holders 28 can thus be easily manipulated and more varied configurations of the positions of the instrument holders 28 is possible. Also, the controls for the dental instruments 26 always remain easily accessible by the students.

Preferably, some functions of each dental instrument 26, such as actuation and/or termination of the operation of each dental instrument 26, is controlled by one or more of the control buttons 19 of the control panel 18 of the platform 16. Other functions of each dental instrument 26, such as the water or air flow speed of each instrument 26, in turn, are preferably controlled by a foot pedal control (not shown). However, it will be understood that all functions of each dental instrument 26 may be controlled by the control buttons 19 of the control panel 18 of the platform 16. It will also be understood that a single control button 19 may be provided for controlling the operation of all of the dental instruments or, alternatively, individual control buttons 19 may be provided to control individual or groups of dental instruments 26.

In one embodiment, in the storage position of the simulator 10, the foot pedal is stored on a recess 58 formed in the second end 14b of the base 14.

The upward or downward simultaneous movement of at least the first portion 18 of the platform 16 (and more preferably the entire platform 16), the torso support 25 and each instrument holder 28 is preferably controlled by a motor (not shown). The motor is preferably housed within an interior of the base 14. Actuation and operation of the motor is preferably controlled by one or more actuators 60 provided on the head portion 29 of the torso support 25. More particularly, a lateral side of the head portion 29 preferably includes a control panel 62 with at least two control buttons 60, and more preferably at least three control buttons 60.

At least one, but preferably two, of the control buttons 60 provided on the control panel 62 are preferably height adjustment control buttons 60 which, upon selection, initiate the motor to move at least the first portion 18 of the platform 16 (and more preferably the entire platform 16), the torso support 25 and each instrument holder 28 in the upward or downward directions along the longitudinal axis L of the base 14. More particularly, upon selection of at least one, but preferably two, of the control buttons 60, the motor is initiated to move the connector assembly 56 in the upward or downward directions along the longitudinal axis L of the base 14.

Thus, in use, the student can selectively and easily adjust the longitudinal height of at least the first portion 18 of the platform 16 (and more preferably the entire platform 16), the torso support 25 and each instrument holder 28 by manipulation of just one control button 60. The student may then select one or more additional control buttons 19 on the platform 16 to commence and control operation of one or more of the dental instruments 26.

One of the control buttons 60 provided on the control panel 62 of the head portion 29 of the torso support 25 is preferably a release button or knob which, upon actuation, releases the torso support 25 from the operable or stored positions. The release knob 60 is preferably an air-actuated knob, such that upon actuation of the release knob 60, an air piston is released and the torso support 25 is free to pivot.

It will also be understood that the simulator 10 may include various additional apparatus which are typically found in dental offices. For example, the simulator 10 may include a light apparatus (not shown) for illuminating the oral cavity 24a of the mannequin head 24.

Those skilled in the art will appreciate that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A dental simulator comprising:
   a base having a first end, an opposing second end, and a longitudinal axis extending from the first end toward the second end;
   a platform connected to the base, the platform having at least a first portion which is movably connected to the base;
   at least a first actuator on the first portion of the platform;
   a torso support movably connected to the base; and
   at least a first instrument holder movably connected to the base;
   wherein at least the first portion of the platform, the torso support, and the first instrument holder are configured to move in unison with respect to the base along the longitudinal axis thereof.

2. The dental simulator of claim 1, wherein the torso support includes a second actuator and longitudinal movement of the first portion of the platform, the torso support, and the first instrument holder is controlled by the second actuator.

3. The dental simulator of claim 1, wherein the platform, the torso support and the first instrument holder are connected to a connector assembly which is movably connected to the base.

4. The dental simulator of claim 1, further comprising a mannequin torso secured to the torso support and a mannequin head secured to the mannequin torso, the mannequin torso and the mannequin head being configured to move in unison with the first portion of the platform, the torso support, and the first instrument holder with respect to the base along the longitudinal axis thereof.

5. The dental simulator of claim 4, wherein the mannequin torso is axially pivotable about the longitudinal axis.

6. The dental simulator of claim 4, wherein the mannequin head is axially pivotable about the longitudinal axis and about a lateral axis of the base, the lateral axis extending generally perpendicular to the longitudinal axis.

7. The dental simulator of claim 4, wherein the mannequin torso includes a pair of shoulder portions and a chest portion, the shoulder and chest portions being separately removable from a remainder of the mannequin torso.

8. The dental simulator of claim 1, further comprising a first extender arm pivotally connected to the base, the first instrument holder being attached to the first extender arm.

9. The dental simulator of claim 8, wherein the first extender arm is configured to be stored within a footprint of the base.

10. The dental simulator of claim 8, further comprising a second extender arm pivotally connected to the base and a second instrument holder attached to the second extender arm, the first and second extender arms being configured to rotate relative to each other about a common vertical axis.

11. The dental simulator of claim 10, wherein the first instrument holder is configured to support a tray.

12. The dental simulator of claim 1, further comprising at least one dental instrument removably secured to the first instrument holder.

13. The dental simulator of claim 12, wherein the at least one dental instrument is operatively connected to the at least one actuator of the platform.

14. The dental simulator of claim 13, wherein the first instrument holder is devoid of any electrical components or controls.

15. The dental simulator of claim 1, wherein the torso support is pivotally connected to the base, such that in a first position of the simulator, the torso support extends generally perpendicular to the longitudinal axis of the base, and in a second position of the simulator, the torso support extends generally parallel to the longitudinal axis of the base.

* * * * *